United States Patent
Pankratz et al.

(10) Patent No.: US 8,650,929 B2
(45) Date of Patent: Feb. 18, 2014

(54) METHOD AND APPARATUS FOR DETERMINING A FLOW RATE ERROR IN A VIBRATING FLOW METER

(75) Inventors: Anthony William Pankratz, Arvada, CO (US); Joel Weinstein, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 274 days.

(21) Appl. No.: 13/320,121

(22) PCT Filed: May 27, 2009

(86) PCT No.: PCT/US2009/045304
§ 371 (c)(1),
(2), (4) Date: Nov. 11, 2011

(87) PCT Pub. No.: WO2010/138117
PCT Pub. Date: Dec. 2, 2010

(65) Prior Publication Data
US 2012/0055229 A1 Mar. 8, 2012

(51) Int. Cl.
*G01F 25/00* (2006.01)
(52) U.S. Cl.
USPC ........................................................ 73/1.34
(58) Field of Classification Search
USPC ............ 73/1.34, 861.354, 861.355, 861.356; 702/54, 100
See application file for complete search history.

(56) References Cited

U.S. PATENT DOCUMENTS

| 4,109,524 | A | * | 8/1978 | Smith ...................... 73/861.357 |
| RE31,450 | E | * | 11/1983 | Smith ...................... 73/861.356 |
| 4,491,025 | A | * | 1/1985 | Smith et al. .............. 73/861.355 |
| 5,576,500 | A | | 11/1996 | Cage et al. |
| 5,594,180 | A | | 1/1997 | Carpenter et al. |
| 6,327,915 | B1 | | 12/2001 | Van Cleeve et al. |
| 6,546,811 | B2 | * | 4/2003 | Fincke ....................... 73/861.63 |
| 6,556,931 | B1 | | 4/2003 | Hays et al. |
| 6,701,890 | B1 | * | 3/2004 | Suhre et al. .................. 123/350 |
| 2007/0186686 | A1 | | 8/2007 | Drahm et al. |
| 2007/0260426 | A1 | * | 11/2007 | Hayashi ........................ 702/183 |

FOREIGN PATENT DOCUMENTS

RU 2164009 C2 10/2001

* cited by examiner

*Primary Examiner* — Hezron E Williams
*Assistant Examiner* — David Z Huang
(74) *Attorney, Agent, or Firm* — The Ollila Law Group LLC

(57) ABSTRACT

A method for determining an error in a flow rate of a fluid flowing through a vibrating flow meter is provided. The method includes the step of receiving sensor signals from the vibrating flow meter. A first flow rate is determined using the sensor signals. A fluid density is determined. A fluid velocity is determined using the first flow rate, the fluid density, and a physical property of the flow meter. A flow parameter, V/p is calculated based on the fluid velocity and the density. A flow rate error is then determined based on the calculated flow parameter.

12 Claims, 6 Drawing Sheets

METHOD AND APPARATUS FOR DETERMINING A FLOW RATE ERROR IN A VIBRATING FLOW METER

TECHNICAL FIELD

The present invention relates to vibrating flow meters, and more particularly, to a method and apparatus for determining flow rate errors in a vibrating flow meter.

BACKGROUND OF THE INVENTION

Vibrating flow meters, such as for example, vibrating densitometers and Coriolis flow meters are generally known and are used to measure mass flow and other information for materials flowing through a conduit in the flow meter. Exemplary Coriolis flow meters are disclosed in U.S. Pat. Nos. 4,109,524, 4,491,025, and Re. 31,450 all to J. E. Smith et al. These flow meters have one or more conduits of straight or curved configuration. Each conduit configuration in a Coriolis mass flow meter has a set of natural vibration modes, which may be of simple bending, torsional, or coupled type. Each conduit can be driven to oscillate at a preferred mode.

Material flows into the flow meter from a connected pipeline on the inlet side of the flow meter, is directed through the conduit(s), and exits the flow meter through the outlet side of the flow meter. The natural vibration modes of the vibrating, material filled system are defined in part by the combined mass of the conduits and the material flowing within the conduits.

When there is no flow through the flow meter, a driving force applied to the conduit(s) causes all points along the conduit(s) to oscillate with identical phase or small initial fixed phase offset, which can be corrected. As material begins to flow through the flow meter, Coriolis forces cause each point along the conduit(s) to have a different phase. For example, the phase at the inlet end of the flow meter lags the phase at the centralized driver position, while the phase at the outlet leads the phase at the centralized driver position. Pick-off sensors on the conduit(s) produce sinusoidal signals representative of the motion of the conduit(s). Signals output from the pick-off sensors are processed to determine the phase difference between the pick-off sensors. The phase difference between the two or more pick-off sensors is proportional to the mass flow rate of material flowing through the conduit(s).

Meter electronics connected to the driver generates a drive signal to operate the driver and determines a mass flow rate and other properties of a material from signals received from the pick-off sensors. The driver may comprise one of many well known arrangements; however, a magnet and an opposing drive coil has received great success in the flow meter industry. An alternating current is passed to the drive coil for vibrating the conduit(s) at a desired flow tube amplitude and frequency. It is also known in the art to provide the pick-off sensors as a magnet and coil arrangement very similar to the driver arrangement. However, while the driver receives a current which induces a motion, the pick-off sensors can use the motion provided by the driver to induce a voltage. The magnitude of the time delay measured by the pick-off sensors is very small; often measured in nanoseconds. Therefore, it is necessary to have the transducer output be very accurate.

Generally, a Coriolis flow meter can be initially calibrated and a flow calibration factor can be generated. In use, the flow calibration factor can be multiplied by the phase difference measured by the pick-off sensors to generate a mass flow rate. In most situations, once the Coriolis flow meter is initially calibrated, typically by the manufacturer, the meter can provide accurate measurements of the fluid being measured without accounting for variations in fluid properties. Although some prior art meters do provide some compensation for temperature and/or pressure effects, this is mainly to compensate for a change in the flow conduit stiffness. However, it has been determined that in some situations, other fluid properties can produce errors in the mass or volume flow rate output by the meter electronics. The errors are generally greater with higher density fluids, such as, for example, some hydrocarbon fluids. However, depending upon the required meter accuracy, the errors may be experienced with fluids of a variety of densities.

Therefore, there is a need in the art for a method to detect and compensate for errors in flow rate measurements using a measurable flow parameter. The present invention overcomes this and other problems and an advance in the art is achieved.

SUMMARY OF THE INVENTION

A method for determining an error in a flow rate of a fluid flowing through a vibrating flow meter is provided. The method comprises the step of receiving sensor signals from the vibrating flow meter. The method further comprises the steps of determining a first flow rate using the sensor signals and determining a fluid density. A fluid velocity is determined based on the first flow rate, the fluid density, and a physical property of the vibrating flow meter. A flow parameter, $V/\rho$ is determined based on the fluid velocity and the density. The method further comprises the step of determining a flow rate error based on the calculated flow parameter.

A meter electronics for a vibrating flow meter is provided according to an embodiment of the invention. The meter electronics includes a processing system. The processing system is configured to receive sensor signals from the vibrating flow meter. The processing system can be further configured to determine a first flow rate using the sensor signals and determine a fluid density. The processing system can be further configured to determine a fluid velocity based on the first flow rate, the density, and a physical property of the vibrating flow meter. A flow parameter, $V/\rho$ is determined based on the fluid velocity and the density. The processing system is further configured to determine a flow rate error based on the calculated flow parameter.

Aspects

According to an aspect of the invention, a method for determining an error in a flow rate of a fluid flowing through a vibrating flow meter, comprises the steps of:

receiving sensor signals from the vibrating flow meter;
determining a first flow rate using the sensor signals;
determining a fluid density, p;
determining a fluid velocity, V, using the first flow rate, the fluid density, and a physical property of the vibrating flow meter;
calculating a flow parameter, $V/\rho$ based on the fluid velocity and the density; and
determining a flow rate error based on the calculated flow parameter.

Preferably, the step of determining the flow rate error comprises comparing the calculated flow parameter to a previously determined correlation between the flow parameter and flow rate errors.

Preferably, the step of determining the flow rate error comprises comparing the calculated flow parameter and the fluid density to previously determined correlations between the flow parameter and flow rate errors for one or more fluid densities.

Preferably, the method further comprises the step of:
generating a compensated flow rate based on the first flow rate and the flow rate error.

Preferably, the method further comprises the steps of:
comparing the flow rate error to a threshold value; and
generating a compensated flow rate based on the first flow rate and the flow rate error if the flow rate error exceeds the threshold value.

Preferably, the method further comprises the steps of measuring a fluid temperature and adjusting the flow rate error based on a difference between the measured fluid temperature and a temperature used for a previously determined correlation between the flow parameter and flow rate errors.

According to another aspect of the invention, meter electronics for a vibrating flow meter includes a processing system configured to:
receive sensor signals from the vibrating flow meter;
determine a first flow rate using the sensor signals;
determine a fluid density, $\rho$;
determine a fluid velocity, V, using the first flow rate, the fluid density, and a physical property of the vibrating flow meter;
calculate a flow parameter, $V/\rho$ based on the fluid velocity and the density; and
determine a flow rate error based on the calculated flow parameter.

Preferably, the processing system is further configured to determine the flow rate error by comparing the calculated flow parameter to a previously determined correlation between the flow parameter and flow rate errors.

Preferably, the processing system is further configured to determine the flow rate error by comparing the calculated flow parameter and the fluid density to previously determined correlations between the flow parameter and flow rate errors for one or more fluid densities.

Preferably, the processing system is further configured to generate a compensated flow rate based on the first flow rate and the flow rate error.

Preferably, the processing system is further configured to compare the flow rate error to a threshold value and generate a compensated flow rate based on the first flow rate and the flow rate error if the flow rate error exceeds the threshold value.

Preferably, the processing system is further configured to measure a fluid temperature and adjust the flow rate error based on a difference between the measured fluid temperature and a temperature used for a previously determined correlation between the flow parameter and flow rate error.

DETAILED DESCRIPTION OF THE INVENTION

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
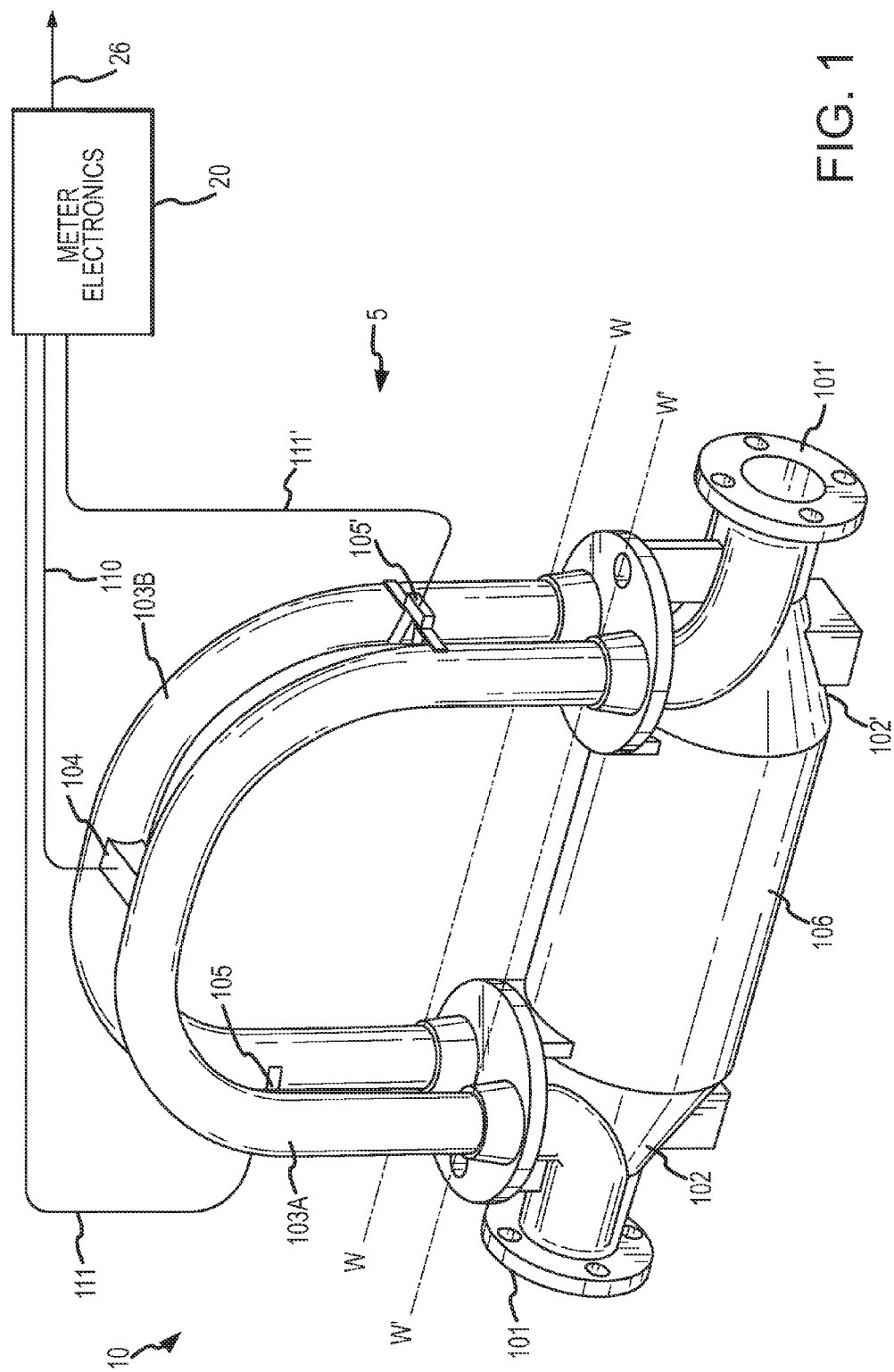
FIG. 1 shows a flow meter according to an embodiment of the invention.

FIG. 1 illustrates an example of a vibrating sensor assembly 5 in the form of a Coriolis flow meter comprising a flow meter 10 and one or more meter electronics 20. The one or more meter electronics 20 are connected to flow meter 10 to measure a characteristic of a flowing material, such as, for example, density, mass flow rate, volume flow rate, totalized mass flow, temperature, and other information.

The flow meter 10 includes a pair of flanges 101 and 101', manifolds 102 and 102', and conduits 103A and 103B. The conduits 103A and 103B comprise an internal cross sectional area, A, which is either known or can be easily measured. Manifolds 102, 102' are affixed to opposing ends of the conduits 103A, 103B. Flanges 101 and 101' of the present example are affixed to manifolds 102 and 102'. Manifolds 102 and 102' of the present example are affixed to opposite ends of spacer 106. Spacer 106 maintains the spacing between manifolds 102 and 102' in the present example to prevent undesired vibrations in conduits 103A and 103B. The conduits extend outwardly from the manifolds in an essentially parallel fashion. When flow meter 10 is inserted into a pipeline system (not shown) which carries the flowing material, the material enters flow meter 10 through flange 101, passes through inlet manifold 102 where the total amount of material is directed to enter conduits 103A and 103B, flows through conduits 103A and 103B and back into outlet manifold 102' where it exits the flow meter 10 through flange 101'.

The flow meter 10 includes a driver 104. The driver 104 is affixed to conduits 103A, 103B in a position where the driver 104 can vibrate the conduits 103A, 103B in the drive mode. More particularly, the driver 104 includes a first driver component (not shown) affixed to conduit 103A and a second driver component (not shown) affixed to conduit 103B. Driver 104 may comprise one of many well known arrangements, such as a magnet mounted to the conduit 103A and an opposing coil mounted to the conduit 103B.

In the present example, the drive mode is the first out of phase bending mode and the conduits 103A and 103B are preferably selected and appropriately mounted to inlet manifold 102 and outlet manifold 102' so as to provide a balanced system having substantially the same mass distribution, moments of inertia, and elastic modules about bending axes W-W and W'-W', respectively. In the present example, where the drive mode is the first out of phase bending mode, the conduits 103A and 103B are driven by driver 104 in opposite directions about their respective bending axes W and W'. A drive signal in the form of an alternating current can be provided by one or more meter electronics 20, such as for example via pathway 110, and passed through the coil to cause both conduits 103A, 103B to oscillate. Those of ordinary skill in the art will appreciate that other drive modes may be used within the scope of the present invention.

The flow meter 10 shown includes a pair of pick-offs 105, 105' that are affixed to conduits 103A, 103B. More particularly, a first pick-off component (not shown) is located on conduit 103A and a second pick-off component (not shown) is located on conduit 103B. In the embodiment depicted, the pick-offs 105, 105' are located at opposing ends of the conduits 103A, 103B. The pick-offs 105, 105' may be electromagnetic detectors, for example pick-off magnets and pick-off coils that produce pick-off signals that represent the velocity and position of the conduits 103A, 103B. For example, the pick-offs 105, 105' may supply pick-off signals to the one or more meter electronics 20 via pathways 111, 111'. Those of ordinary skill in the art will appreciate that the motion of the conduits 103A, 103B is proportional to certain characteristics of the flowing material, for example, the mass flow rate and density of the material flowing through the conduits 103A, 103B.

It should be appreciated that while the flow meter 10 described above comprises a dual flow conduit flow meter, it is well within the scope of the present invention to implement a single conduit flow meter. Furthermore, while the flow conduits 103A, 103B are shown as comprising a curved flow conduit configuration, the present invention may be implemented with a flow meter comprising a straight flow conduit configuration. Therefore, the particular embodiment of the flow meter 10 described above is merely one example and should in no way limit the scope of the present invention.

In the example shown in FIG. 1, the one or more meter electronics 20 receive the pick-off signals from the pick-offs 105, 105'. Path 26 provides an input and an output means that allows one or more meter electronics 20 to interface with an operator. The one or more meter electronics 20 measure a characteristic of a flowing material, such as, for example, density, mass flow rate, volume flow rate, totalized mass flow, temperature, and other information. More particularly, the one or more meter electronics 20 receive one or more signals, for example, from pick-offs 105, 105' and one or more temperature sensors (not shown), and use this information to measure a characteristic of a flowing material, such as, for example, density, mass flow rate, volume flow rate, totalized mass flow, temperature, and other information.

The techniques by which vibrating measuring devices, such as, for example, Coriolis flow meters or densitometers, measure a characteristic of a flowing material are well understood; therefore, a detailed discussion is omitted for brevity of this description.

One problem associated with vibrating flow meters, such as the flow meter 10 is the presence of errors in the flow rate measurement that occur due to various fluid properties. The flow rate error may correspond to a mass flow rate or a volume flow rate, for example. During operation it is often difficult to provide accurate estimates of how large of an error is present in the flow rate measurement. According to an embodiment of the invention, the meter electronics 20 can generate a compensated flow rate measurement once the magnitude of the error is known. According to an embodiment of the invention, the meter electronics 20 can compensate for flow rate errors based on a correlation between a measurable flow parameter and a predictable flow rate error.

Figure 2:
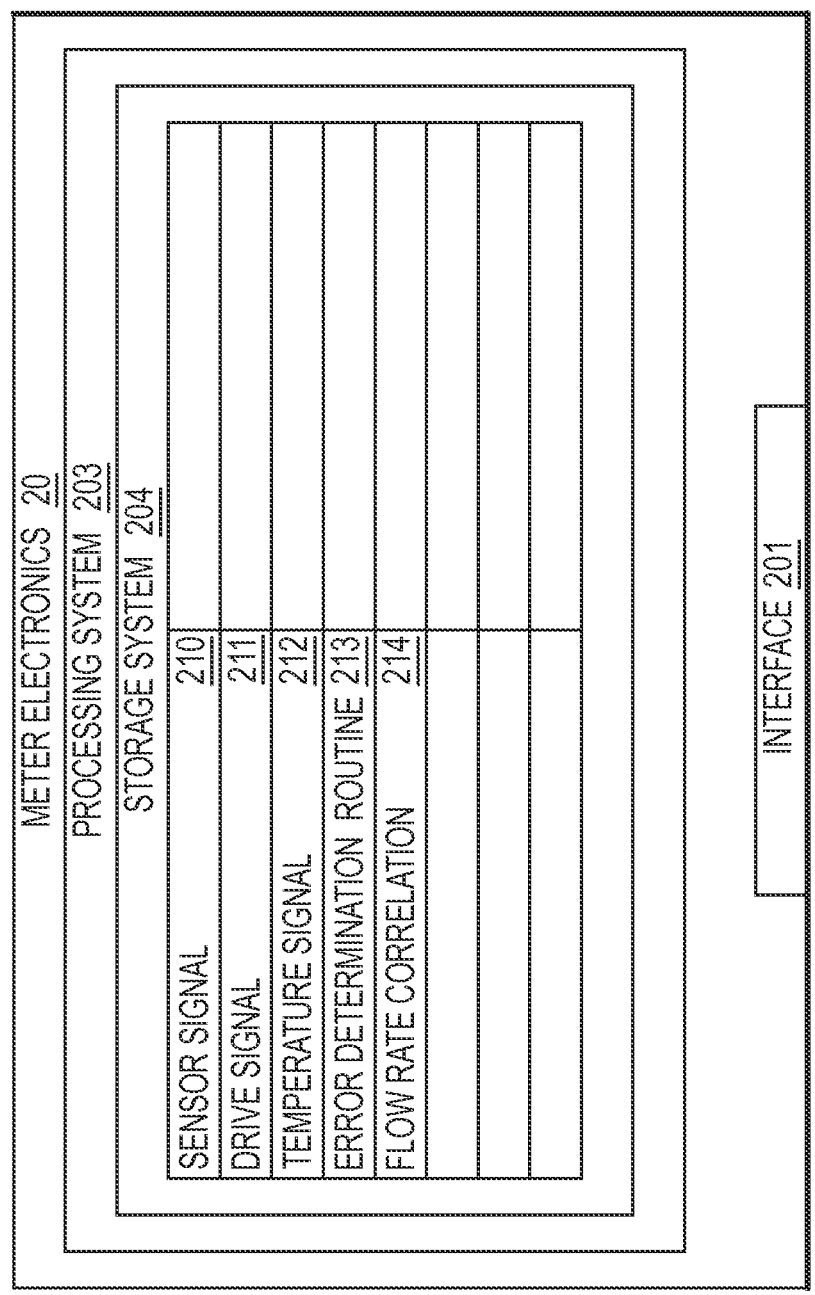
FIG. 2 shows a meter electronics according to an embodiment of the invention.

FIG. 2 shows the meter electronics 20 according to an embodiment of the invention. The meter electronics 20 can include an interface 201 and a processing system 203. The processing system 203 may include a storage system 204. The storage system 204 may comprise an internal memory as shown, or alternatively, may comprise an external memory. The meter electronics 20 can generate a drive signal 211 and supply the drive signal 211 to the driver 104. In addition, the meter electronics 20 can receive sensor signals 210 from the flow meter 10, such as pick-off/velocity sensor signals. In some embodiments, the sensor signals 210 can be received from the driver 104. The meter electronics 20 can operate as a densitometer or can operate as a mass flow meter, including operating as a Coriolis flow meter. The meter electronics 20 can process the sensor signals 210 in order to obtain flow characteristics of the material flowing through the flow conduits 103A, 103B. For example, the meter electronics 20 can determine one or more of a phase difference, a frequency, a time difference, a density, a temperature, a mass flow rate, a volume flow rate, a meter verification, etc. In some embodiments, the meter electronics 20 may receive a temperature signal 212 from one or more RTDs or other temperature measuring devices, for example.

The interface 201 can receive the sensor signals 210 from the pick-off sensors 105, 105', or the driver 104 via leads 110, 111, 111'. The interface 201 may perform any necessary or desired signal conditioning, such as any manner of formatting, amplification, buffering, etc. Alternatively, some or all of the signal conditioning can be performed in the processing system 203. In addition, the interface 201 can enable communications between the meter electronics 20 and external devices. The interface 201 can be capable of any manner of electronic, optical, or wireless communication.

The interface 201 in one embodiment can include a digitizer (not shown), wherein the sensor signal comprises an analog sensor signal. The digitizer can sample and digitize the analog sensor signal and produce a digital sensor signal. The digitizer can also perform any needed decimation, wherein the digital sensor signal is decimated in order to reduce the amount of signal processing needed and to reduce the processing time.

The processing system 203 can conduct operations of the meter electronics 20 and process flow measurements from the flow meter 10. The processing system 203 can execute one or more processing routines, such as the error determination routine 213, and thereby process the flow measurements in order to produce one or more flow characteristics.

The processing system 203 can comprise a general purpose computer, a micro-processing system, a logic circuit, or some other general purpose or customized processing device. The processing system 203 can be distributed among multiple processing devices. The processing system 203 can include any manner of integral or independent electronic storage medium, such as the storage system 204.

The processing system 203 processes the sensor signal 210 in order to generate the drive signal 211, among other things. The drive signal 211 is supplied to the driver 104 in order to vibrate the associated flow tube(s), such as the flow tubes 103A, 103B of FIG. 1.

It should be understood that the meter electronics 20 may include various other components and functions that are generally known in the art. These additional features are omitted from the description and the figures for the purpose of brevity. Therefore, the present invention should not be limited to the specific embodiments shown and discussed.

As the processing system 203 generates the various flow characteristics, such as for example, the mass flow rate or volume flow rate, an error may be associated with the generated flow rate. Although errors associated with conduit stiffness due to temperature and pressure are typically compensated for, additional errors have been discovered that may be attributable to one or more fluid properties of the fluid flowing through the flow meter 10.

According to an embodiment of the invention, a relationship can be determined between the error in the flow rate measurement and a new flow parameter, $V/\rho$, where V is the fluid velocity in the flow conduits 103A, 103B; and p is the fluid density. The fluid velocity, V, can be determined based on the mass flow rate, the density, and a physical property of the flow meter, i.e., the internal flow area of the flow meter. Through experimental calibration, it has been determined that for various fluids, a reliable correlation exists between the error typically present in the flow rate measurement and the flow parameter V/ρ. Although the flow rate error is generally greater with fluids having higher densities, for example, certain hydrocarbons, the particular fluids used should not limit the scope of the present invention. Because the flow parameter V/ρ can be easily measured with most vibrating flow meters, including Coriolis flow meters, once the relationship between the flow rate error and the flow parameter for a given density is known, the measured flow parameter V/ρ can be compared to the known relationship to determine the error in the flow measurement. According to an embodiment of the invention, an error compensated flow rate can then be generated once the relationship between the flow parameter and the flow rate error is known.

By way of example, it is commonly known that vibrating flow meters, including Coriolis flow meters, are capable of measuring a mass flow rate, a volumetric flow rate, a density, and a temperature among other things Mass flow rate can be defined by equation 1.

$$\dot{m} = \rho A V \tag{1}$$

Where:
$\dot{m}$ is the measured mass flow rate;
$\rho$ is the measured density;
A is the total internal cross sectional flow area of the one or more flow conduits; and
V is the average velocity of the fluid in the one or more flow conduits.

The only unknown in equation (1) is V, the average velocity. This is because the other variables are known from meter design or can easily be measured by the flow meter 10 according to well known techniques. Therefore, equation (1) can be rearranged and solved for V.

$$V = \frac{\dot{m}}{\rho A} \tag{2}$$

With the average velocity, V, calculated, the velocity can be divided by the density, ρ, to calculate the flow parameter of interest, V/ρ. It should be appreciated that density may comprise the density measured by the flow meter 10 or alternatively, may comprise a standard density based on standard conditions. As another alternative, the density may be input by a user if the fluid composition is known. Although most liquids are essentially incompressible, and therefore, the density does not vary significantly with temperature or pressure, it is well within the scope of the invention to adjust the density based on a measured temperature and/or pressure. The temperature and/or pressure may be measured by the Coriolis meter or externally from the Coriolis meter.

In order for the flow parameter V/ρ to be useful for determining a flow rate error, the relationship between the flow parameter V/ρ and a flow rate error for the meter is needed. More specifically, a correlation should be known for the flow parameter V/ρ at a variety of different values of V/ρ for a variety of fluids with different densities. Furthermore, if temperature effects are a concern, then a correlation can be generated at a variety of temperatures as well. The correlations may be generated during an initial calibration of the flow meter 10, for example. The correlations may be meter specific and therefore, a different correlation may be required for each individual flow meter, for example. The correlation may then be stored in the storage system 204 of the meter electronics 20, such as flow rate correlation 214, for example. The correlation that is generated may be stored in a variety of formats for future use, for example, look-up tables, look-up graphs, equations, etc.

It should be noted that any calculation, measurement, or input of velocity would suffice for the correlation of the present invention, and that the average conduit velocity is used by example only, and should in no way limit the scope of the present invention. Pipeline velocity, maximum tube velocity, or an externally determined velocity may also provide the necessary information for a compensation using the flow parameter V/ρ. In addition, the density may be measured by the Coriolis meter, measured by an external device, or input by a user. The sources of the density or velocity inputs are not critical.

According to an embodiment of the invention, the correlation may be generated by performing a plurality of calibration tests on the flow meter 10 using a variety of fluids having different densities and flowing at a variety of flow rates to correlate various values of the flow parameter V/ρ for each density. By way of example, the flow meter 10 was tested using a variety of hydrocarbons having various densities. Although hydrocarbons were used in the present example, it should be appreciated that the present invention is not limited to hydrocarbons and the particular fluid or class of fluids used should not limit the scope of the present invention. A flow rate measurement was generated for each fluid at a variety of flow rates. The flow rate generated by the flow meter 10 was then compared to the known flow rate to produce a flow rate error. The known flow rate may be provided by a prover or master meter that is connected inline with the flow meter 10 as is generally known in the art. The results are reproduced in FIG. 3.

Figure 3:
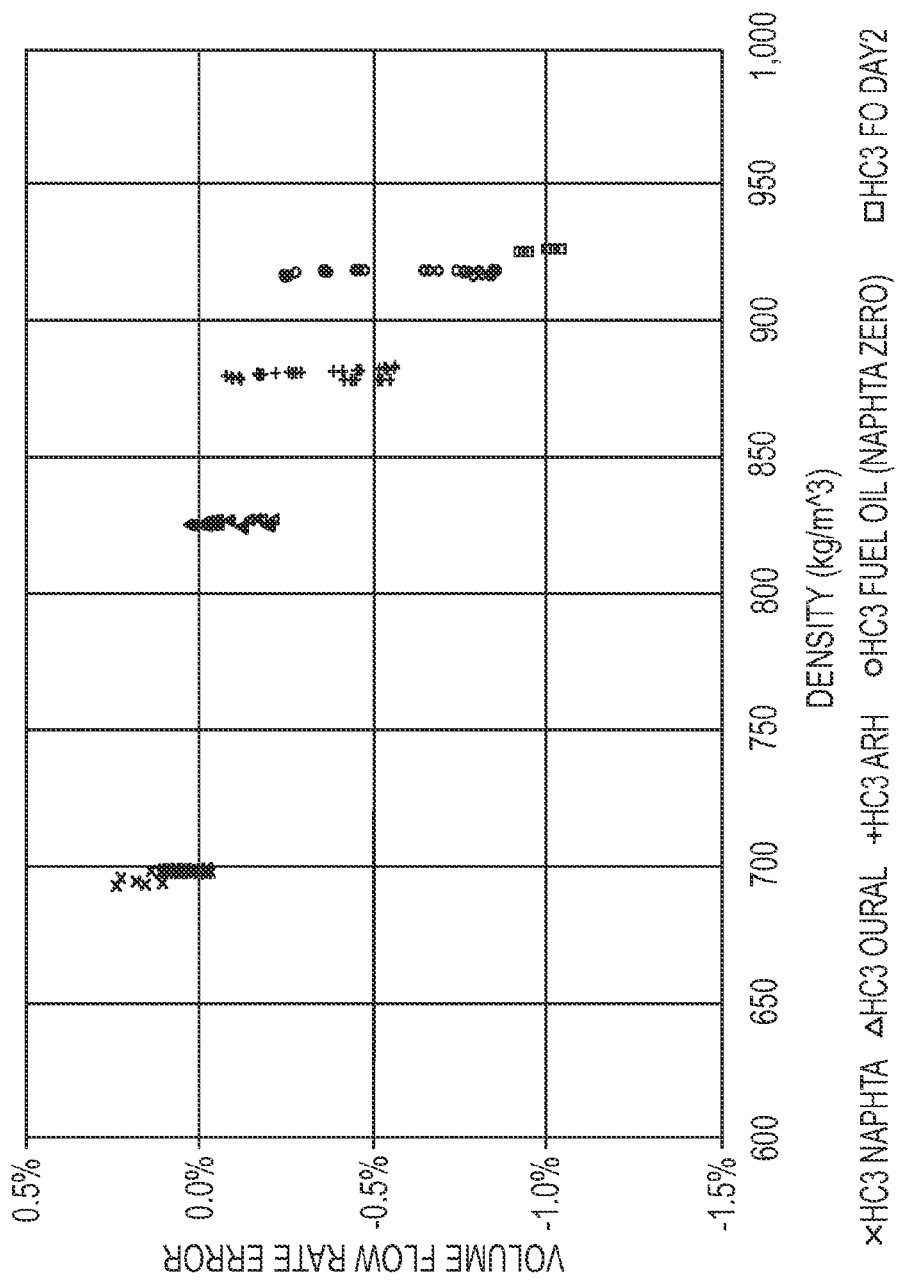
FIG. 3 shows an example of a graph of flow rate error versus density for a variety of flow rates.

FIG. 3 shows a chart of volume flow rate error versus density for a plurality of different flow rates. Although the chart of FIG. 3 is shown as volumetric flow rate, it can be appreciated that the chart may likewise be generated as mass flow rate and remain within the scope of the present invention. As can be seen in FIG. 3, the error in the flow rate measurement generally increases as the fluid density increases. In fact for the lightest fluid tested in this example, the error is practically negligible and may be caused by laboratory error rather than flow meter error. Therefore, according to an embodiment of the invention, a threshold density may be determined where the error determination routine 213, as described below, is not implemented unless the fluid density exceeds the threshold density. Although the information of FIG. 3 provides useful information, the flow parameter of interest is V/ρ. Therefore, if V/ρ is calculated for the same calibration runs, then a chart of flow rate error versus the flow parameter V/ρ can be generated.

Figure 4:
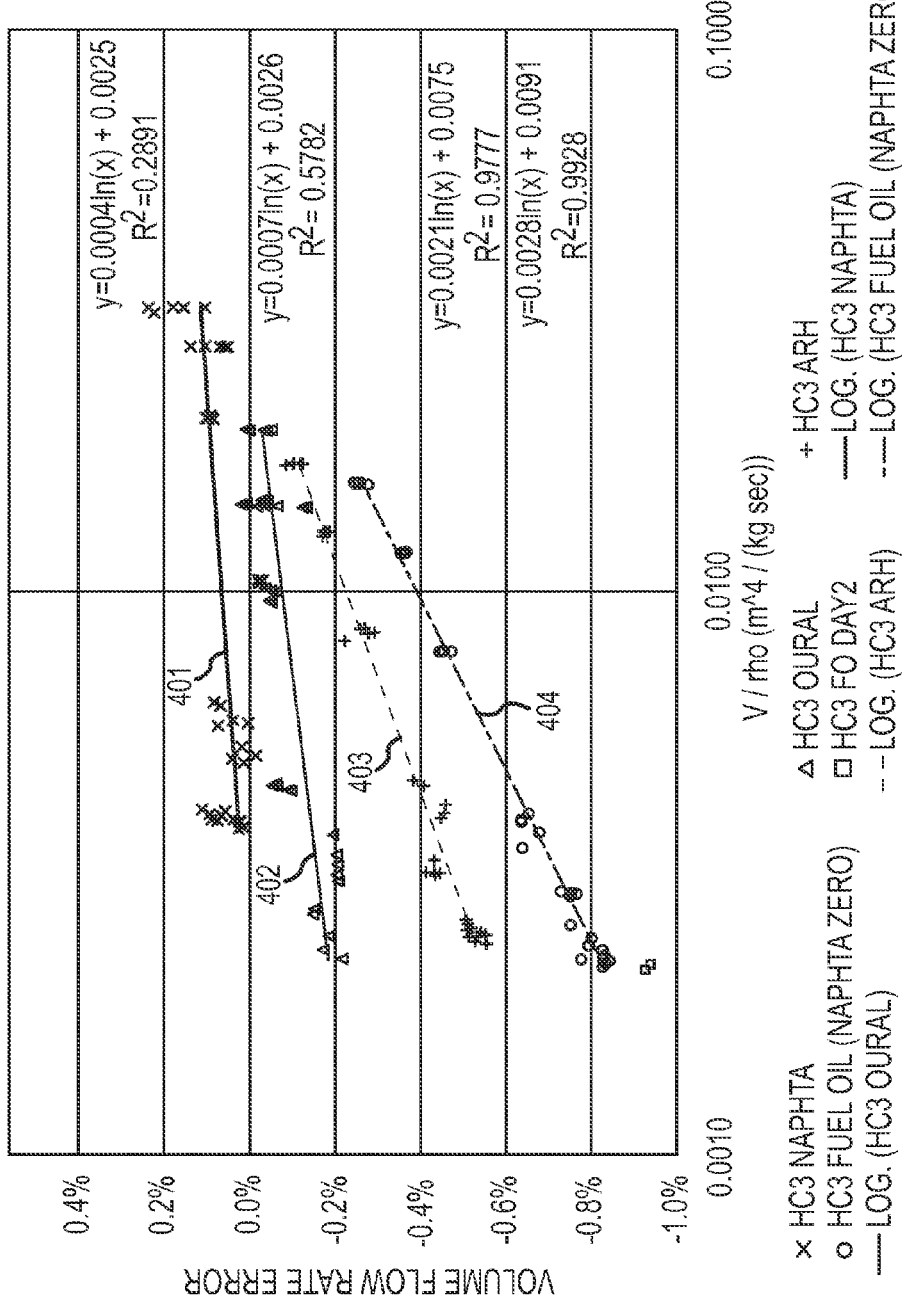
FIG. 4 shows an example of a graph of flow rate error versus the flow parameter $V/\rho$ according to an embodiment of the invention.

FIG. 4 illustrates an example plot of the flow rate error shown as a percentage versus the flow parameter, V/ρ for various hydrocarbons. As shown, for a given fluid density, the flow rate error is approximately linear with the natural log of the flow parameter, V/ρ for the hydrocarbon fluids selected. This is shown for each of the fluids using trend lines 401-404. The test data used to generate each trend line 401-404 corresponds to a relatively constant density. In other words, the flow parameter values that comprise line 401 are based on the same fluid. In contrast, the flow parameter values of line 401 correspond to a fluid having a different density than the flow parameter values that comprise line 402. As can be seen, the flow rate error generally increases as the flow parameter increases for a given density. Also, for a given flow parameter value, as density increases, the flow rate error also increases. Because of these general trends, a reliable relationship exists between the flow parameter V/ρ and the flow rate error for a particular meter. Furthermore, interpolating between flow parameter values provides a relatively accurate determination of the flow rate error produced by the particular meter.

Using a logarithmic scale, a curve fit equation can be generated that represents the correlation between the flow parameter, $V/\rho$ and the flow rate error for a single fluid density. As can be seen, for each density, another equation can be generated relating $V/\rho$ to the flow rate error for that density. For other fluids or classes of fluids, for example non-hydrocarbons, a different relationship may exist between $V/\rho$ and error, and a different form of the curve fit or look-up table may be required. Although the flow rate error is shown in terms of volumetric flow rate error, it should be appreciated that a similar chart could be easily generated using mass flow rate error and, when a Coriolis flow meter is used, such a plot could eliminate the step of converting the measured mass flow into a volumetric flow rate as Coriolis flow meters measure mass flow directly.

As can be seen from FIG. 4, the flow rate error approaches –1% for certain values of $V/\rho$ for the particular fluids used. This may comprise a significant error in the flow measurement. Therefore, it is clear that error compensation is desirable. Although the flow parameter $V/\rho$ is initially calculated using the uncompensated flow rate, as can be seen in FIG. 4, the error in the flow parameter based on the error in the flow rate will have very little impact on the correlated error. Take for example, the maximum error in flow rate for the trend line 404, which approaches, but does not reach –1%. The value for $V/\rho$ at that point is approximately $0.0035 \text{ m}^4/(\text{kg}^*\text{s})$. Therefore, even if the error were –1%, the flow parameter value for $V/\rho$ is within $0.000035 \text{ m}^4/(\text{kg}^*\text{s})$ of the originally calculated flow parameter $V/\rho$ found using the uncompensated flow rate. Therefore, it can be appreciated that the variation in compensation error due to this small error in the flow parameter, $V/\rho$ can typically be ignored. It would also be possible to iterate the flow compensation procedure until the value of velocity used as an input to the compensation is consistent with the corrected value of flow rate.

It should be appreciated that the specific values and fluids used in FIGS. 3 & 4 are merely examples to illustrate the present invention. Therefore, the particular examples provided in the figures should in no way limit the scope of the present invention. It should also be appreciated that while the correlation between the flow rate error and the natural log of the flow parameter $V/\rho$ is approximately linear for the hydrocarbon fluids utilized in the example, the correlation with other fluids having other densities and other physical properties may not produce a linear correlation. However, it can easily be appreciated that a similar correlation can be generated using trending techniques that are well known in the art. Therefore, if a user knows or anticipates that the flow meter will measure a specific fluid or class of fluids, a similar correlation can be generated for the specific fluid or class of fluids for that meter.

Using the information provided in FIG. 4, or a similar plot, look-up table, equation, etc., the processing system 203 can perform the error determination routine 213 according to an embodiment of the invention.

Figure 5:
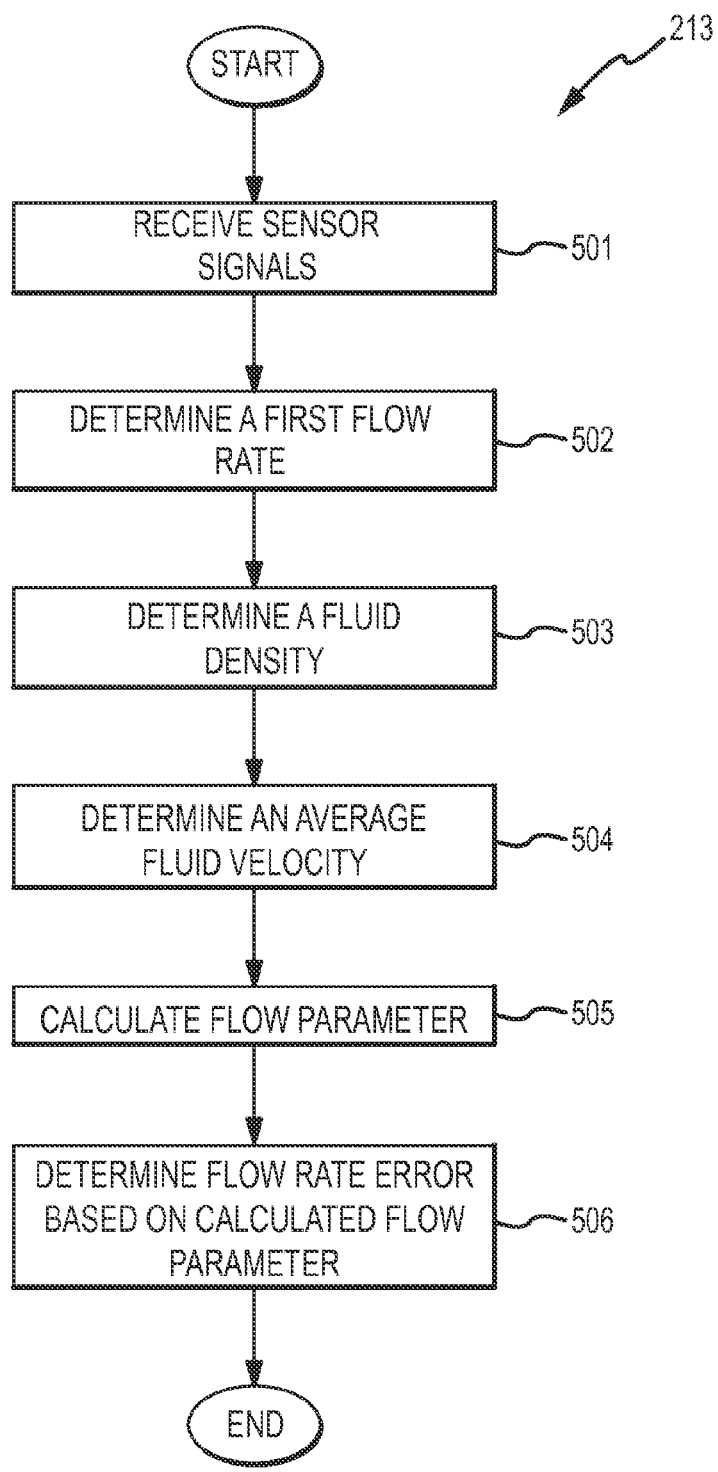
FIG. 5 shows an error determination routine according to an embodiment of the invention.

FIG. 5 shows an error determination routine 213 according to an embodiment of the invention. The error determination routine 213 may be performed by the meter electronics 20 during normal operation, for example. The error determination routine 213 may be performed according to specific time or measurement intervals. For example, the error determination routine 213 may be performed once every 10 seconds or once every 10 measurements. These numbers are provided only as an example and should not limit the scope of the present invention in any way. Alternatively, the error determination routine 213 could be performed on a substantially continuous basis. The error determination routine 213 may be implemented to determine an error in a flow rate of a fluid. In some embodiments, the error determination routine 213 may also be used to compensate for the error in the flow rate.

The error determination routine 213 begins in step 501 where sensor signals are received from the flow meter 10. The sensor signals may include a phase difference, a frequency, a temperature, a pressure, etc. Based on the received sensor signals, the error determination routine 213 can proceed to step 502 where the signals are processed to generate one or more of a first mass flow rate, a temperature, and a volumetric flow rate.

In step 503 a fluid density can be determined. The fluid density may be generated based on the sensor signals, for example. As an alternative to generating a density based on the sensor signals, the density may be generated based on data input by a user or retrieved from a stored density. The stored density could be a density corresponding to standard temperature and pressure conditions, for example.

The fluid density may be compared to a threshold fluid density. According to an embodiment of the invention, a determination can be made as to whether the generated density exceeds the threshold density. If the generated density does not exceed a threshold density, the error determination routine 213 may end. For example, as shown in FIG. 3, if the density is below a threshold value of about 750 kg/m³, the error associated with the flow rate measurement may not be significant enough to continue with the error determination routine 213. The threshold value may be determined based on the required accuracy or the measurement capabilities of the flow meter, for example. If on the other hand, the generated density exceeds the threshold value, the error determination routine 213 can proceed on to step 504. It should be appreciated that the density comparison may be omitted in some embodiments. This may be particularly true in embodiments where the fluid flowing through the flow meter 10 is known to exceed the threshold density, for example. Although the above example discusses situations where a determination is made as to whether the generated density exceeds the threshold density, according to another embodiment, a similar determination may be made as to whether the generated density is less than the threshold density. This may be true, for example, in situations where the flow rate error increases with decreasing density.

In step 504, the fluid velocity can be determined using the first mass flow rate, the density, and a physical property of the flow meter 10. The physical property may comprise the total internal flow area of the flow meter 10, for example. In the embodiment of the flow meter 10 shown in FIG. 1, the internal area of the flow meter 10 would comprise the total combined internal area of the flow conduits 103A, 103B, for example. The fluid velocity, V, may be determined according to equation 2 above.

In step 505, the meter electronics 20 can calculate the flow parameter $V/\rho$ based on the data generated in steps 502-504. The flow parameter $V/\rho$ may be calculated using the operating density as measured by the flow meter 10 or using a stored density, for example. The stored density could correspond to a density of the fluid at standard conditions. Alternatively, the stored density could correspond to the density of the fluid at the measured temperature.

In step 506, a flow rate error can be determined using the flow parameter $V/\rho$ calculated in step 505. According to an embodiment of the invention, the flow rate error may be determined by comparing the flow parameter calculated in step 505 with a previously determined correlation between flow parameters and flow rate errors such as the flow rate correlation 214 stored in meter electronics 20. For example, the flow rate error may be determined using a graph, such as the graph in FIG. 4. Alternatively, a look-up table or an equation may be used based on the calculated flow parameter $V/\rho$. The particular method used to retrieve the flow rate error should not limit the scope of the present invention. In many situations, the previously determined correlation may have been determined by a manufacturer during an initial calibration as discussed above.

According to another embodiment of the invention, the flow rate error may be determined by comparing the flow parameter calculated in step 505 as well as the fluid density with previously determined correlations between the flow parameters and flow rate errors for one or more different densities. For example, in FIG. 4, four correlations were generated, with each correlation corresponding to a specific fluid density. Therefore, if more than one correlation is known, the flow rate error would be determined based not only on the flow parameter calculated in step 505, but also on the fluid density calculated in step 503 in order to ensure that the appropriate correlation is being used.

It should be appreciated that the flow rate error may need to be obtained by interpolation based on the correlations available. For example, with reference to FIG. 4, if the fluid being measured comprises a density between two of the fluids included in the graph, then the flow rate error would likely fall between the flow rate error for fluids having higher and lower densities with the same flow parameter $V/\rho$ value. This sort of interpolation may not produce adequate results if the fluid properties are substantially different. For example, in the example shown in FIG. 4, all of the fluids calibrated were hydrocarbons. Therefore, if the fluid being measured was another hydrocarbon, interpolating would probably give adequate results. However, a fluid with substantially different properties may not produce adequate results and therefore another correlation would need to be generated.

Furthermore, if temperature is a concern, then an adjustment to the flow rate error may be required based on the temperature used in the correlation and the measured temperature. The adjustment may adjust the temperature to standard conditions. The conditions chosen for "standard" conditions may comprise any condition desired as long as the conditions are consistent between measurements. Alternatively, additional calibrations can be performed for the adjustment made to the flow rate error. For example, additional calibrations similar to that shown in FIG. 4 could be performed at a variety of temperatures. Therefore, if the measured temperature does not correspond to a temperature for which a calibration was performed, then the flow rate error may be adjusted by interpolating between two or more previously determined calibrations between flow rate error and the flow parameter $V/\rho$ at different temperatures, for example.

Once a flow rate error is determined based on the measured flow parameter $V/\rho$, the flow rate measurement may be compensated to generate a compensated flow rate measurement that accounts for the flow rate error calculated in step 506. The compensated flow measurement may be more accurate by an order of magnitude or more. The compensated flow rate may then be output by the meter electronics 20 or stored for future use.

Alternatively, the flow rate error could be compared to a threshold value. If, for example, the flow rate error is less than the threshold value, a compensated flow rate may not be generated. Rather, the flow rate error may be ignored and the routine 213 may end. This may be true for example, if the flow rate error is within a tolerance range or is considered to be less than the flow meter's sensitivity. Those skilled in the art will readily recognize additional reasons for comparing the flow rate error to a threshold value and the particular examples provided should in no way limit the scope of the present invention.

Figure 6:
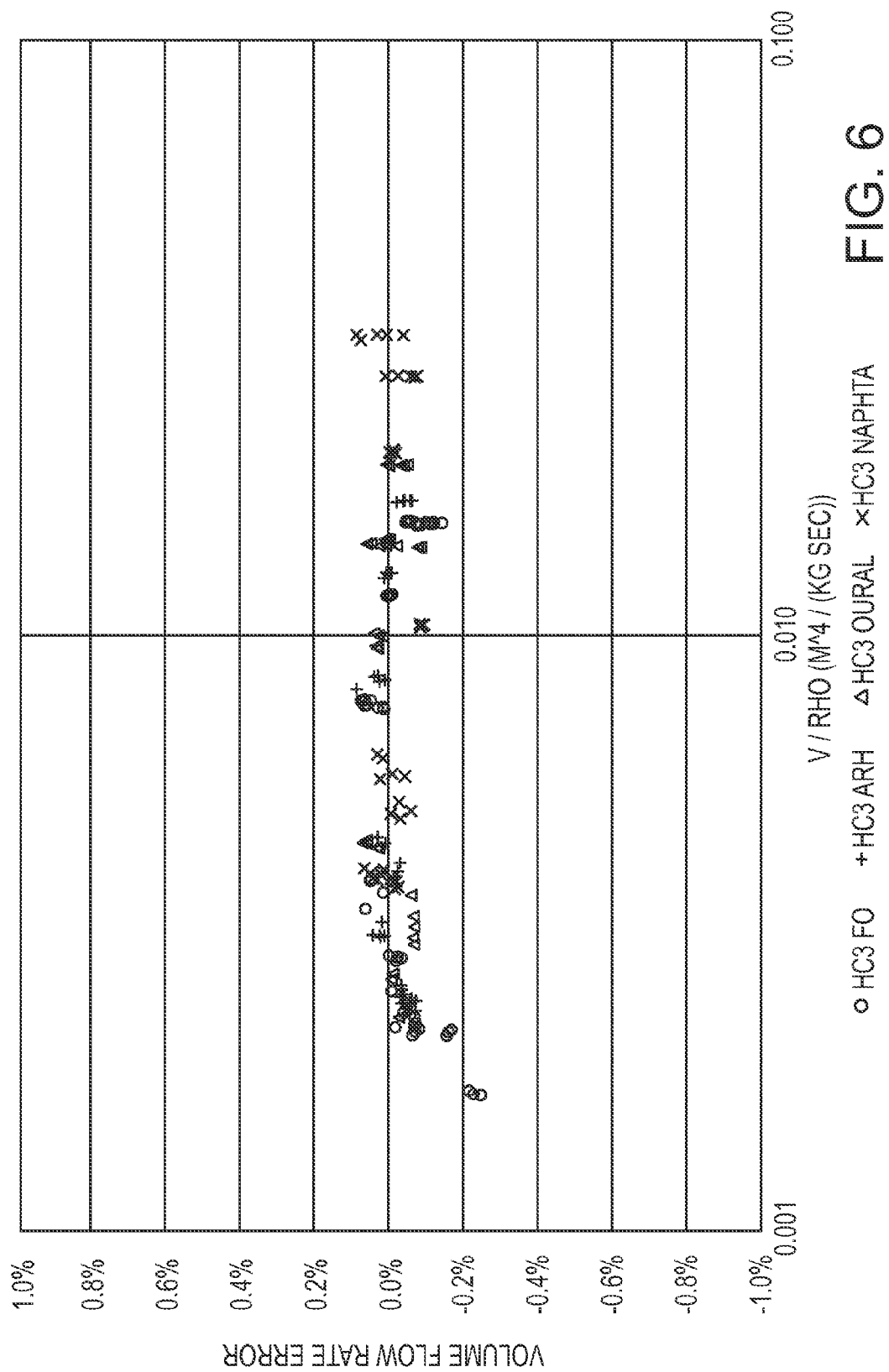
FIG. 6 shows an example of a graph of flow rate error versus a compensated flow parameter $V/\rho$ according to an embodiment of the invention.

FIG. 6 shows an example plot of the flow parameter $V/\rho$ based on a compensated flow rate measurement. It should be appreciated that the data in FIG. 6 could easily be shown as a mass flow rate or a volume flow rate rather than the flow parameter $V/\rho$. However, using the same variables as in FIG. 4 allows FIG. 6 to be illustrated according to the same scale in order to better appreciate the validity of the present invention. FIG. 6 was generated by correcting the flow rate measurement based on the flow rate error calculated using FIG. 4. As can be seen, the majority of the compensated data has an error of less than +/−0.1%. This is in contrast to the data of FIG. 4 where some of the calculations had an error approaching −1.0%. Therefore, it can be appreciated that the compensated flow measurement is greatly improved from the uncompensated flow rate.

As described above, certain flow rate errors have been discovered that can be compensated for based on the new flow parameter $V/\rho$. The flow rate errors may be attributed to certain fluid properties, for example. The flow parameter, $V/\rho$ has been experimentally determined to provide reliable correlations to the flow rate errors. Therefore, once the flow meter is calibrated, the flow rate error associated with the flow meter can be determined based on a measured flow parameter $V/\rho$. Because the flow parameter is both easily measured and also provides a reliable correlation, the flow rate errors can be identified and compensated for using known techniques. Advantageously, the flow rate measurements output by the flow meter are more accurate than the measurements of the prior art.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other flow meters, and not just to the embodiments described above and shown in the accompanying figures. Accordingly, the scope of the invention should be determined from the following claims.

We claim:

1. A method for determining an error in a flow rate of a fluid flowing through a vibrating flow meter, comprising the steps of:

receiving sensor signals from the vibrating flow meter;
determining a first flow rate using the sensor signals;
determining a fluid density, $\rho$;
determining a fluid velocity, V, using the first flow rate, the fluid density, and a physical property of the vibrating flow meter;

calculating a flow parameter, V/ρ based on the fluid velocity and the density; and determining a flow rate error based on the calculated flow parameter.

2. The method of claim 1, wherein the step of determining the flow rate error comprises comparing the calculated flow parameter to a previously determined correlation between the flow parameter and flow rate errors.

3. The method of claim 1, wherein the step of determining the flow rate error comprises comparing the calculated flow parameter and the fluid density to previously determined correlations between the flow parameter and flow rate errors for one or more fluid densities.

4. The method of claim 1, further comprising the step of:
generating a compensated flow rate based on the first flow rate and the flow rate error.

5. The method of claim 1, further comprising the steps of:
comparing the flow rate error to a threshold value; and
generating a compensated flow rate based on the first flow rate and the flow rate error if the flow rate error exceeds the threshold value.

6. The method of claim 1, further comprising the steps of measuring a fluid temperature and adjusting the flow rate error based on a difference between the measured fluid temperature and a temperature used for a previously determined correlation between the flow parameter and flow rate errors.

7. Meter electronics (20) for a vibrating flow meter (10) including a processing system (203) configured to:
receive sensor signals (210) from the vibrating flow meter (10);
determine a first flow rate using the sensor signals (210);
determine a fluid density, ρ;
determine a fluid velocity, V, using the first flow rate, the fluid density, and a physical property of the vibrating flow meter;
calculate a flow parameter, V/ρ based on the fluid velocity and the density; and
determine a flow rate error based on the calculated flow parameter.

8. The meter electronics (20) of claim 7, wherein the processing system (203) is further configured to determine the flow rate error by comparing the calculated flow parameter to a previously determined correlation between the flow parameter and flow rate errors.

9. The meter electronics (20) of claim 7, wherein the processing system (203) is further configured to determine the flow rate error by comparing the calculated flow parameter and the fluid density to previously determined correlations between the flow parameter and flow rate errors for one or more fluid densities.

10. The meter electronics (20) of claim 7, wherein the processing system (203) is further configured to generate a compensated flow rate based on the first flow rate and the flow rate error.

11. The meter electronics (20) of claim 7, wherein the processing system (203) is further configured to compare the flow rate error to a threshold value and generate a compensated flow rate based on the first flow rate and the flow rate error if the flow rate error exceeds the threshold value.

12. The meter electronics (20) of claim 7, wherein the processing system (203) is further configured to measure a fluid temperature and adjust the flow rate error based on a difference between the measured fluid temperature and a temperature used for a previously determined correlation between the flow parameter and flow rate errors.

* * * * *